United States Patent [19]
Bailey

[11] Patent Number: 5,666,505
[45] Date of Patent: Sep. 9, 1997

[54] HEURISTIC PREFETCH MECHANISM AND METHOD FOR COMPUTER SYSTEM

[75] Inventor: Joseph A. Bailey, Austin, Tex.

[73] Assignee: Advanced Micro Devices, Inc., Sunnyvale, Calif.

[21] Appl. No.: 209,986

[22] Filed: Mar. 11, 1994

[51] Int. Cl.⁶ ................................................. G06F 9/24
[52] U.S. Cl. ...................... 395/383; 364/948; 364/263.1
[58] Field of Search .................................. 395/377, 775, 395/800, 383, 584

[56] References Cited

U.S. PATENT DOCUMENTS

| | | | |
|---|---|---|---|
| 4,860,197 | 8/1989 | Langendorf et al. | 395/585 |
| 4,914,584 | 4/1990 | Gibson | 395/584 |
| 5,146,570 | 9/1992 | Hester et al. | 395/375 |
| 5,237,666 | 8/1993 | Suzuki et al. | 395/375 |
| 5,394,530 | 2/1995 | Kitta | 395/375 |

OTHER PUBLICATIONS

IBM, "Efficient Scheme To Reduce Over-Prefetching Of Instructions For Loading An Instruction Buffer", Aug. 1990, vol. 33 No. 3B pp. 483–485.
IBM, "Inexpensive History Table For Instruction Prefetch", Feb. 1989, vol. 31 No. 9, pp. 262–264.
J.E. Smith, W. C. Hsu, "Prefetching In Supercomputer Instruction Caches", Nov. 16, 1992, p. 590.

Primary Examiner—David Y. Eng
Attorney, Agent, or Firm—Conley, Rose & Tayon, P.C.; B. Noel Kivlin

[57] ABSTRACT

A heuristic prefetch mechanism that fetches code without solicitation by the execution unit. The prefetch mechanism is configured to normally prefetch sequential code and, if a particular line of requested code is out of sequence with respect to an immediately preceding line of requested code, is configured to store in a memory tag unit the address of the previous instruction along with the subsequently requested out-of-sequence address. If the execution unit later issues another request for the previous instruction, the prefetch mechanism prefetches the corresponding out-of-sequence address stored in the memory tag unit. During each instruction fetch, a comparison is made to determine whether that particular instruction has been stored within the memory tag unit. If the memory tag unit has stored a non-sequential address corresponding to a requested instruction, the non-sequential address is loaded into a prefetch address latch. If no corresponding entry is in the memory tag unit, the address sequential to the requested address is stored within the prefetch address latch. A memory fetch unit subsequently prefetehes the line corresponding to the address within the prefetch address latch and stores the line within a buffer. During each instruction fetch by the CPU core, the memory fetch unit determines whether the requested instruction resides within the buffer and, if present, may provide the code directly.

18 Claims, 4 Drawing Sheets

HEURISTIC PREFETCH MECHANISM AND METHOD FOR COMPUTER SYSTEM

BACKGROUND OF THE INVENTION

1. Field of the Invention

This invention relates to computer systems and more particularly to code prefetching mechanisms and techniques employed within computer systems. The invention also relates to memory control techniques for computer systems.

2. Description of the Relevant Art

A variety of techniques have been developed to increase the overall processing speed of computer systems. While improvements in integrated circuit processing technologies such as submicron processing capabilities have made it possible to dramatically increase the speed of the integrated circuitry itself, other developments in the architectures and bus transfer mechanisms of computer systems have also led to improvements in performance. Exemplary developments include the incorporation of cache memory subsystems as well as code prefetching mechanisms within computer systems.

A cache memory is a high-speed memory unit interposed in the memory hierarchy of a computer system between a slower system memory and a microprocessor to improve effective memory transfer rates and, accordingly, improve system performance. The name refers to the fact that the small cache memory unit is essentially hidden and appears transparent to the user, who is aware only of a larger system memory. The cache is usually implemented by semiconductor memory devices having speeds that are comparable with the speed of the processor, while the system memory utilizes a less costly, lower-speed technology. The cache concept anticipates the likely reuse by the microprocessor of selected data and code in system memory by storing a copy of the selected data in the cache memory.

A cache memory typically includes a plurality of memory sections, wherein each memory section stores a block or a "line" of two or more words. (As used herein, a "word" refers to any predefined number of bits.) Each line has associated with it an address tag that uniquely identifies which line of system memory it is a copy of. When a read request originates in the processor for a new word, whether it be data or instruction, an address tag comparison is made to determine whether a copy of the requested word resides in a line of the cache memory. If present, the data is used directly from the cache. This event is referred to as a cache read "hit". If not present, a line containing the requested word is retrieved from system memory and is stored in the cache memory. The requested word is simultaneously supplied to the processor. This event is referred to as a cache read "miss", and results in a line-fill into the cache.

When the processor desires to write data to memory, a similar address tag comparison is made to determine whether the line into which data is to be written resides in the cache memory. If not present, the data may be written directly into the system memory and/or the corresponding line may be fetched into the cache memory from the system memory to allow the data to be written into that line of the cache memory. This event is referred to as a cache write "miss". If the line is present, the data is written directly into the cache memory. This is referred to as a cache write "hit." In many systems, a dirty bit for the cache line is then set. The dirty bit indicates that data stored within the line is dirty (i.e., has been modified and is inconsistent with system memory), and thus, before the line is deleted from the cache memory or overwritten, the modified data must be written back to system memory.

As stated previously, another feature which has led to improvements in the performance of computer systems is code prefetching. Code prefetch techniques involve the transfer of instruction code from the system memory (or the cache memory) into a temporary buffer, even though the processor has not yet actually requested the prefetched instruction code. Typically, code is prefetched by reading a line of code within the program memory which immediately follows the line containing the currently-executing instruction. Thus, if the code is executing in a sequential manner, as is the typical situation, the prefetched code may be provided directly from the temporary buffer when the processor requests it, rather than having to read the code from system memory. As a result, the overall speed of the computer system may be enhanced.

When prefetching is used to obtain execution code, the system memory is typically controlled to provide the entire line containing the prefetched code at a high data transfer rate. This is typically accomplished by burst memory access. As is well-known, during the data phase of a burst memory access cycle, a new word is provided to the system bus from system memory for each of several successive clock cycles without intervening address phases. The fastest burst cycle (no wait state) requires two clock cycles for the first word (one clock for the address, one clock for the corresponding word), with subsequent words returned from sequential addresses on every subsequent clock cycle. For systems based on the particularly popular model 80486 microprocessor, a total of four "doublewords" are typically transferred during a given burst cycle.

Referring to FIG. 1, a block diagram of an exemplary computer system 10 including a cache memory 12 and a sequential code prefetcher 14 is shown. The cache memory 12 and sequential code prefetcher 14 are coupled to a CPU core 16 and to a bus interface unit 18. A system memory 20 is further coupled to bus interface unit 18 via system bus 22.

Sequential code prefetcher 14 is provided to prefetch a sequential line of code within a program segment of system memory 20. That is, when CPU core 16 is executing a particular instruction, sequential code prefetcher 14 fetches a line of code which is sequential to that containing the currently executing instruction. Since it is probable that the next instruction requested by the CPU core 16 will be sequential with respect to the previously executed instruction, the sequential code prefetcher 14 advantageously allows the sequential instructions to be provided to CPU core 16 much more quickly in comparison to a case in which the CPU core must fetch the code from system memory 20 when needed. The sequential code prefetcher 14 as illustrated in FIG. 1 may include a sequential line adder for determining the address value of the sequential line to be prefetched.

Although the prefetching of sequential code as described above has been quite successful in improving overall performance of computer systems, such sequential code prefetching is ineffective when a branch or a jump instruction is encountered by the microprocessor since the next line of code to be executed when a branch or a jump is taken will not be in address sequence with respect to the address of the branch or jump instruction itself. As a result, when a jump or a branch is executed, the processor may "stall" since it may need to wait for the non-sequential code corresponding to the branch target address to be fetched from system memory. For software programs in which a large number of jump and/or branch instructions are employed, substantial impacts upon performance are often evident as a result of the stalling of the processor.

In an attempt to alleviate the problems of sequential code prefetching when branch or jump instructions are encountered, branch prediction logic has been proposed for incorporation within computer systems. Within such branch prediction logic, when a branch or a jump instruction is decoded and recognized by the processor, the prefetch unit is controlled to prefetch a line of code based upon a history of whether the particular branch or jump instruction had been taken previously and, if so, based upon the target address previously taken. Unfortunately, this branch prediction logic is typically associated with several problems. Firstly, the branch prediction logic is usually quite complex, thus increasing the cost and degrading the overall reliability of the integrated circuit. Furthermore, the prefetch unit must decode a particular instruction to determine whether or not it is a branch or jump instruction before the prefetch of the target address code can be initiated.

A prefetch mechanism and technique are accordingly desirable for a computer system wherein code may be prefetched without solicitation by the execution unit and wherein non-sequential code may be prefetched which corresponds to a target address of a jump or branch instruction. A prefetch mechanism and technique are further desirable wherein the prefetch of the target address instruction of a branch or a jump instruction may be initiated without first requiring that the branch or the jump instruction itself be decoded. A prefetch mechanism and method are finally desirable wherein relatively simple circuitry may be employed for their implementation.

SUMMARY OF THE INVENTION

The problems outlined above are in large part solved by a heuristic prefetch mechanism and method for a computer system according to the present invention. In one embodiment, a heuristic prefetch mechanism is provided that fetches code without solicitation by the execution unit. The heuristic prefetch mechanism is configured to normally prefetch sequential code and, if a particular line of requested code is out of sequence with respect to an immediately preceeding line of requested code, is configured to "remember" and store the address of the previous instruction along with the out-of-sequence address of the subsequently requested code. If the execution unit later issues another request for the previous instruction, the heuristic prefetch mechanism uses the out-of-sequence address for prefetching the next line of code.

The heuristic prefetch mechanism includes a non-sequential monitor for determining whether code fetches are sequential, and an SRAM tag unit for storing a portion of the previous address along with the out-of-sequence subsequent address. During each instruction fetch of the execution unit, a comparison operation is made to determine whether a non-sequential history of that particular instruction has been stored within the SRAM tag unit. If the SRAM memory tag unit stores a non-sequential address corresponding to the particular instruction, the non-sequential address is loaded into a prefetch address latch. If the SRAM tag unit contains no corresponding entry, the address of the next sequential line is stored within the prefetch address latch. A memory fetch state machine subsequently prefetches the line corresponding to the address within the prefetch address latch, and stores the line within a prefetch code buffer. During each instruction fetch by the CPU core, the memory fetch state machine determines whether the requested instruction resides within the prefetch code buffer and, if present, provides the code directly from the prefetch code buffer. If the requested code is not contained by the prefetch code buffer, the memory fetch state machine executes a cycle to retrieve the requested code from system memory.

As a result of the heuristic prefetch mechanism and technique of the present invention, code may be prefetched without solicitation by the execution unit. Both sequential and non-sequential code may be prefetched, thereby accommodating both linear instructions and branch or jump instructions. The prefetch mechanism and technique do not require that a particular instruction be decoded to determine whether a sequential line or a non-sequential line should be prefetched. Accordingly, the prefetch mechanism and technique may be implemented using relatively simple circuitry.

Broadly speaking, the present invention contemplates a prefetch unit for a computer system capable of prefetching instruction code from a system memory. The prefetch comprises a prefetch code buffer capable of storing prefetched code, a prefetch address latch for storing an address value of code to be prefetched, and a memory fetch state machine capable of fetching from the system memory code corresponding to the address value within the prefetch code address latch and capable of providing the code to the prefetch code buffer. The prefetch unit further comprises a non-sequential monitor capable of detecting whether an address of non-sequential code is non-sequential with respect to an address of a previous code, and a memory tag unit capable of storing the address of the non-sequential code in response to the non-sequential monitor. The prefetch unit finally includes a comparator unit coupled to the memory tag unit and capable of determining whether an address of new code corresponds to an entry within the memory tag unit, wherein the address of the non-sequential code is provided to the prefetch address latch.

The present invention further contemplates a method for prefetching instruction code from a system memory comprising the steps of determining whether an address of a particular code request by a CPU core is non-sequential with respect to an address of a previous code request, storing the address of the particular code if it is non-sequential with respect to the address of the previous code request, and determining whether an address of a subsequent code request corresponds to the previous code request. The method further comprises the step of prefetching the particular code from the system memory.

BRIEF DESCRIPTION OF THE DRAWINGS

Other objects and advantages of the invention will become apparent upon reading the following detailed description and upon reference to the accompanying drawings in which.

Figure 1:
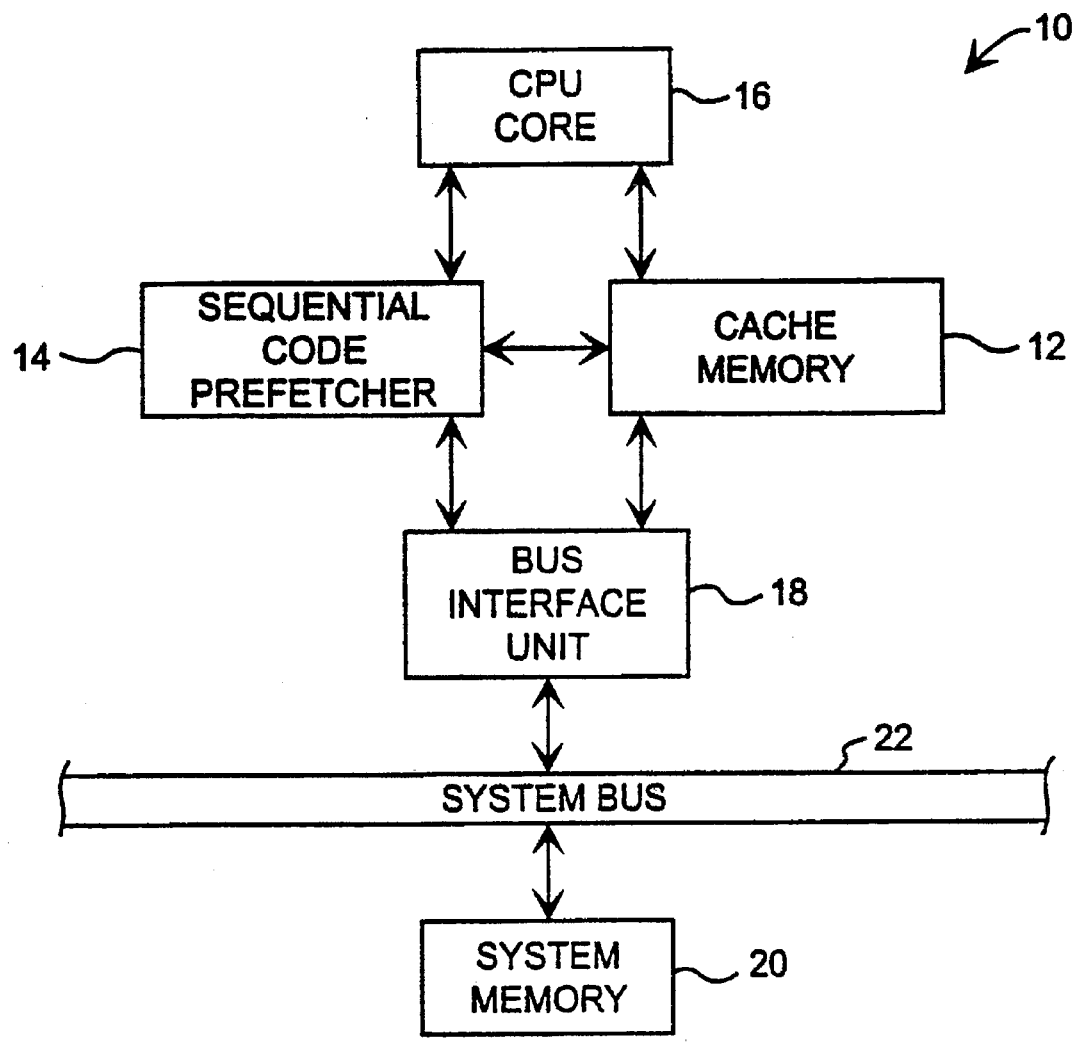
FIG. 1 is a block diagram of an exemplary computer system including a sequential code prefetcher.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 2:
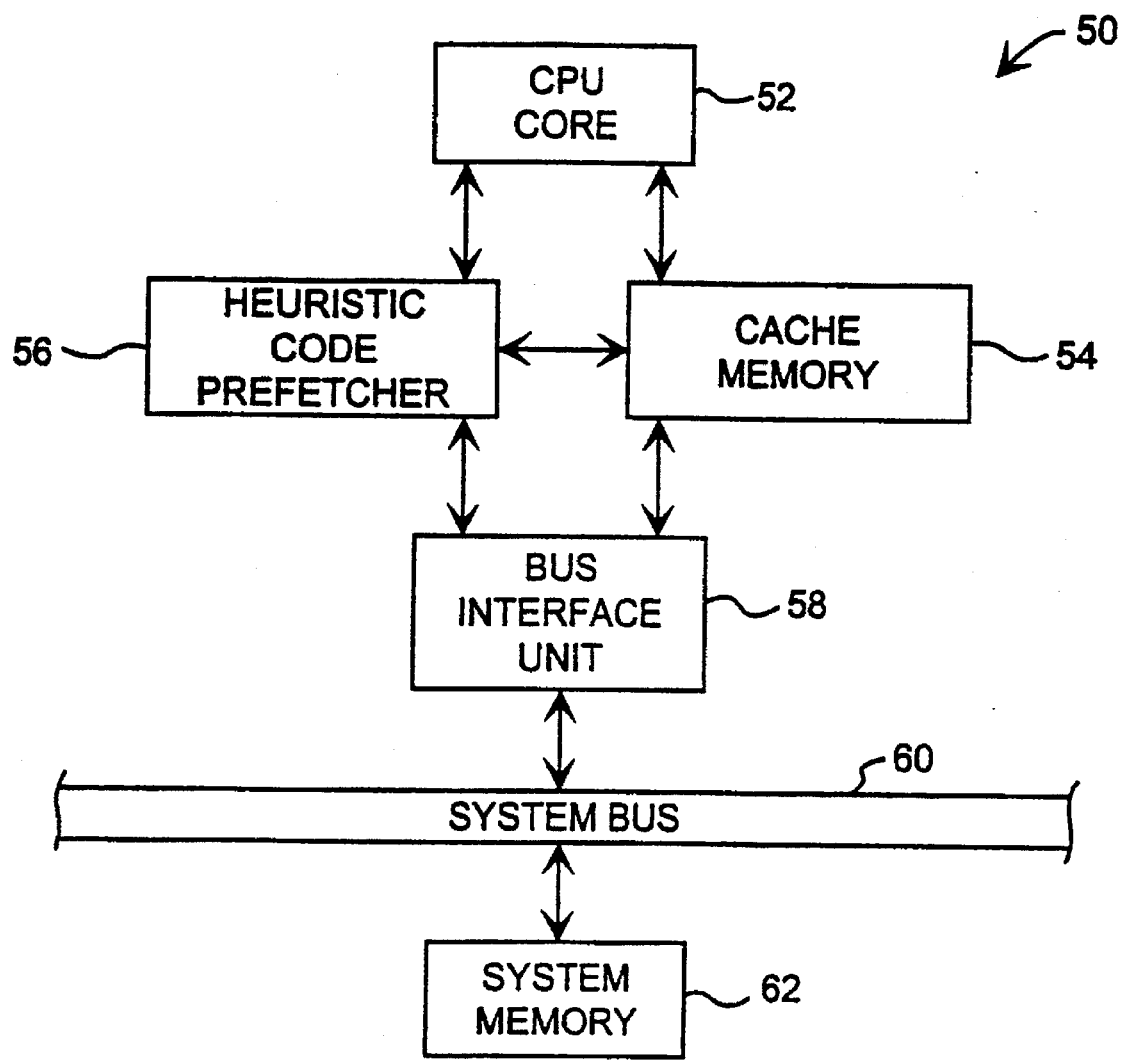
FIG. 2 is a block diagram of a computer system including a heuristic code prefetcher in accordance with the present invention.

Referring next to FIG. 2, a block diagram of a computer system 50 including a heuristic prefetch mechanism according to the present invention is shown. The computer system 50 includes a CPU core 52 coupled to a cache memory 54 and a heuristic code prefetcher 56. A bus interface unit 58 couples the heuristic code prefetcher 56 and the cache memory 54 to a system bus 60. A system memory 62 is finally shown coupled to system bus 60.

The computer system 50 illustrated in FIG. 2 is an exemplary system in which the heuristic code prefetcher 56 may be employed. However, it is noted that several variations of the computer system 50 could be made without departing from the spirit and scope of the invention. For example, although a cache memory 54 is employed within the computer system 50, it is contemplated that the heuristic prefetch mechanism and technique as described below may be adapted to systems that do not employ a cache memory.

In the illustrated form, CPU core 52 is a data processing unit that implements a predetermined instruction set. Exemplary processing units include the models 80386 and 80486 microprocessors, as well as others. It is noted that in the embodiment of FIG. 2, CPU core 52, cache memory 54, and heuristic prefetch unit 106 are implemented on a common integrated circuit chip.

Heuristic code prefetcher 56 is provided for prefetching instruction code from system memory 62. As will be explained in greater detail below, heuristic code prefetcher 56 normally prefetches a line of code which is sequential to the code currently being requested by CPU core 52. If the CPU core 52 requests code which is contained by a line that is non-sequential with respect to the line containing the previously executed code (that is, which is not in line-address sequence), the heuristic code prefetcher 56 stores the non-sequential line address and associates it with a tag identifying the address of the previous instruction. If the CPU core 52 subsequently requests this previous instruction upon another iteration of the program code, the heuristic code prefetcher 56 performs a tag comparison to determine that a non-sequential address has been stored with respect to that code. The heuristic code prefetcher 56 accordingly prefetches the code corresponding to this non-sequential address, and stores the prefetched code within a temporary buffer. Thus, since there is a probability that the CPU core 52 will in fact again request the non-sequential code, the heuristic code prefetcher 56 can provide the non-sequential code directly rather than requiring an immediate fetch of the non-sequential code from system memory 62. Stalling of the CPU core 52 may thereby be avoided when prefetch predictions are accurate.

Figure 3:
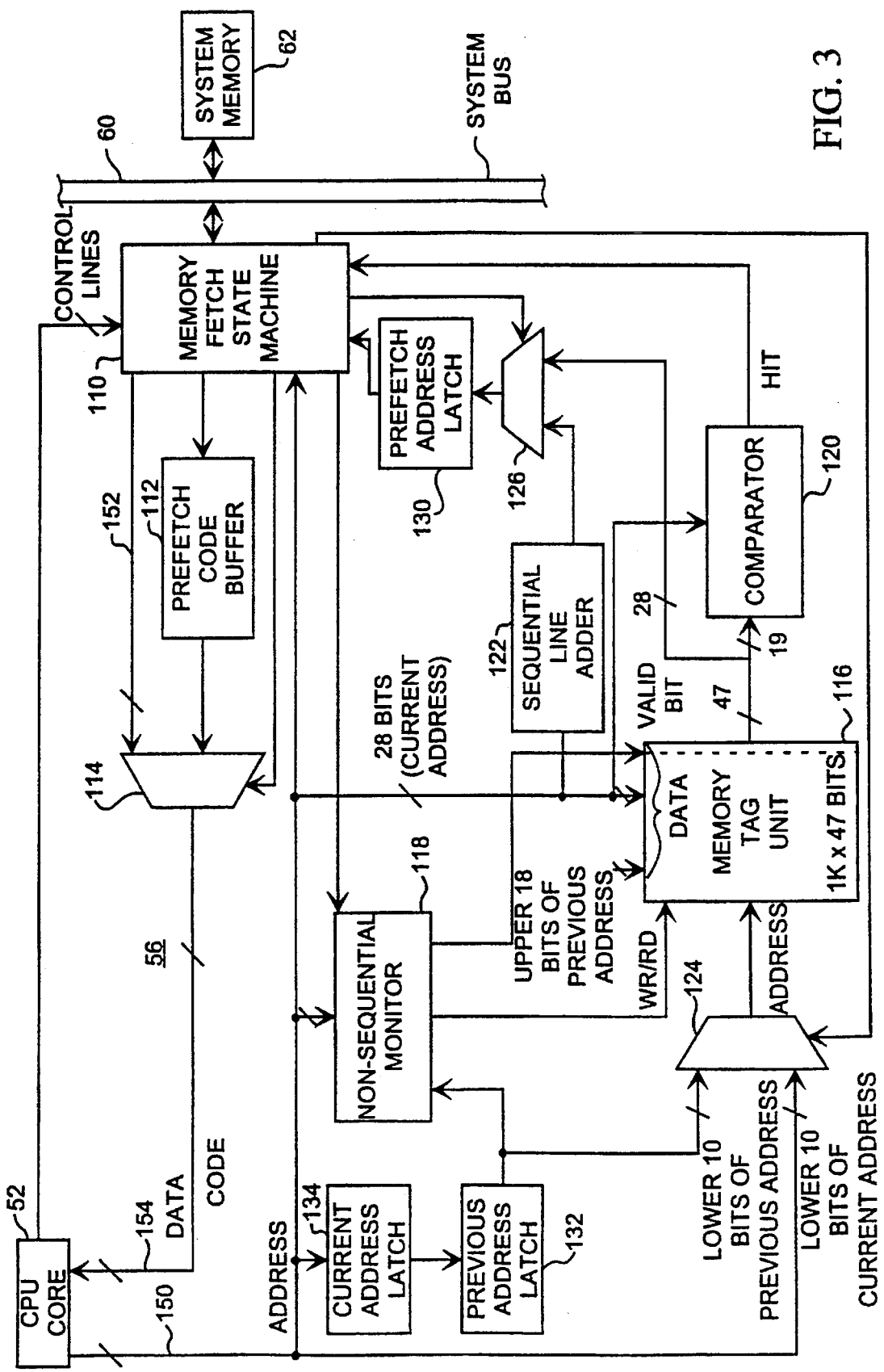
FIG. 3 is a block diagram of a heuristic code prefetcher for a computer system in accordance with the present invention.

Referring next to FIG. 3, a block diagram is shown of portions of computer system 50 including the heuristic code prefetcher 56. Circuit portions that correspond to those of FIG. 2 are numbered identically. It is noted that selected portions of computer system 50 have been omitted from the drawing for simplicity and clarity.

In its illustrated form, the heuristic prefetch unit 56 includes a memory fetch state machine 110 coupled to system bus 60 and to CPU core 52. A prefetch code buffer 112 and a multiplexer 114 are further shown coupled between memory fetch state machine 110 and CPU core 52.

A memory tag unit 116 is shown coupled to a non-sequential monitor 118, to a comparator 120, to a sequential line adder 122, and to multiplexers 124 and 126. A prefetch address latch 130 is finally shown coupled to memory fetch state machine 110, and a previous address latch 132 as well as a current address latch 134 are shown coupled to non-sequential monitor 118.

Memory fetch state machine 110 is provided for fetching both currently requested code (by CPU core 52) from system memory 108 and for prefetching code from system memory 108. Prefetch address latch 130 is provided for storing a line address of system memory 62 from which code is to be prefetched. As will be understood further below, this prefetched code address may be either sequential or non-sequential with respect to a line containing the currently executing instruction. When code is required by CPU core 52, the address bus 150 is driven with a valid address signal, and the control lines 152 are driven with the appropriate read signals to initiate an instruction fetch cycle. In response to such a request, memory fetch state machine 110 is capable of determining whether the requested code currently resides within prefetch code buffer 112 and, if not, of generating a corresponding read cycle on system bus 60 to transfer the requested code from system memory 62. This requested code is then provided to CPU core 52 through data lines 152 and through multiplexer 114 to data bus 154.

Non-sequential monitor 118 is provided to detect requests of non-sequential code by CPU core 52. If a non-sequential code request is executed by CPU core 52, the non-sequential address along with selected bits of the previous address are stored within memory tag unit 116. Memory tag unit 116 is a static RAM storage unit and, in one embodiment, has a capacity of 1K ×45 bits. Comparator 120 is employed to monitor the address of each current instruction request and to determine whether memory tag unit 116 has recorded a non-sequential fetch that corresponds to the current instruction. If memory tag unit 116 has recorded such a non-sequential prefetch, the address of the non-sequential instruction is loaded into the prefetch address latch 130, and memory fetch state machine 110 prefetches the non-sequential line from system memory 62 and loads it into prefetch code buffer 112. If, on the other hand, no previous non-sequential fetch has been recorded for the currently requested instruction, a value corresponding to the address of a sequential line of code is loaded into prefetch address latch 130 from sequential line adder 122. The memory fetch state machine 110 accordingly fetches the sequential line and loads it into prefetch code buffer 112. Further details follow.

During initial operation of computer system 100, CPU core 102 will execute an instruction fetch cycle to fetch the first word of the execution code. Memory fetch state machine 110 responsively executes a read cycle on system bus 104 to read the first line of code from system memory 108. The first word of the instruction code is thus provided to CPU core 102 through data lines 152, through multiplexer 114, and to data bus 152. The remaining words within the line are further stored within prefetch code buffer 112.

When the address of the currently requested instruction code is driven on bus 150, the address signal is latched into current address latch 132. At this point, the non-sequential monitor 118 will indicate that a non-sequential line request has not yet been requested. Accordingly, memory fetch state machine 110 controls multiplexer 126 such that an address value corresponding to the next sequential line of code (that immediately follows the line containing the currently requested code) is loaded into prefetch address latch 130 from sequential line adder 122. After memory fetch state machine 110 has executed the read cycle on system bus 60 and has provided the first word of requested code to CPU core 52, the memory fetch state machine 110 executes a prefetch cycle to prefetch the line of code corresponding to the address within prefetch address latch 130. This prefetched line of code is stored within another line of storage within prefetch code buffer 112. It is noted that since prefetch code buffer 112 has a storage capacity to accommodate two lines of code, the prefetched line of code does not overwrite the line of code corresponding to the currently executing instruction. Accordingly, if the next instruction requested by CPU core corresponds to either the same line as the previously executed instruction or to the sequential line, the request may be serviced directly by prefetch code buffer 112.

When CPU core 52 requests additional code corresponding to a new line, the new address value at bus 150 is stored within current address latch 134, while the previous address is stored within previous address latch 132. If such new line is sequential with respect to the previously executed code, the new code may be provided directly from prefetch code buffer 112 through multiplexer 114. At the same time, the next sequential line is loaded into prefetch address latch 130 from sequential line adder 122, and memory fetch state machine 110 executes a read cycle to prefetch the next sequential line from system memory 108. Again, this next sequential line of data is loaded into prefetch code buffer 112. This line of code overwrites the first line of code.

If CPU core 52 requests code that is contained by a line that is non-sequential with respect to a previously requested word of code, sequential monitor 118 will detect this condition by comparing the current address value at bus 150 with the previous line address value stored within previous address latch 132. If non-sequential monitor 118 determines that the line address is non-sequential, the current address will be stored within the memory tag unit 116 along with the upper 18 bits of the previous line address within previous address latch. The address location of memory tag unit 116 into which these values are stored is controlled by the lower 10 bits of the previous address. Since at this point the requested non-sequential word of code is not stored within the prefetch code buffer 112, memory fetch state machine 110 additionally executes a read cycle to system memory 108 to read the currently requested code from system memory 108. This code is provided directly to CPU core 52 through data lines 152 and through multiplexer 114. The line containing this code is further stored within prefetch code buffer 112.

Once the address of a non-sequential code request has been stored within memory tag unit 116, memory fetch state machine 110 controls multiplexer 124 such that, when a new instruction fetch cycle is executed by CPU core 52, the lower ten bits of the current address are driven through multiplexer 124 and are provided to the address select lines of memory tag unit 116. Thus, as the instruction fetch cycle proceeds, the portion of the memory tag unit 116 that stores the upper 18 bits of the "previous" address are compared by comparator 120 to the upper 18 bits of the address driven on address bus 150. If a match occurs, a hit is indicated by comparator 120 indicating that the memory tag unit 116 is storing the address of a non-sequential line that was requested next during a previous iteration of the program code. When a hit is indicated by comparator 120, memory fetch state machine 110 controls multiplexer 126 such that the non-sequential line address stored by memory tag unit 116 is driven into prefetch address latch 130, rather than causing the sequential address from sequential line adder 122 to be stored. Memory fetch state machine accordingly prefetches the data corresponding to the value within prefetch address latch 130. It is noted that the if the next address driven by CPU core 102 on address bus 150 in fact corresponds to the same non-sequential address that was requested next during a past iteration, the code will be contained within prefetch code buffer 112, and thus can be provided directly to CPU core 102 through data bus 154 and multiplexer 114. Accordingly, the CPU core 102 need not wait for the non-sequential code to be read from system memory 108 after requesting the code. As a result, the overall speed of the computer system may be increased since there is a probability that the non-sequential code will in fact be requested. Subsequent code fetches by CPU core 52 are treated similarly by heuristic prefetch unit 106.

It is noted that during an initial phase of an instruction fetch cycle, memory fetch state machine 110 controls multiplexer 124 such that the lower 10 bits of the current address drives the addressing lines of memory tag unit 116. This allows the comparator 120 to determine whether the memory tag unit 116 has stored the address of non-sequential code with respect to a past iteration involving the current instruction. After an appropriate time (which is allocated for comparator 120 to determine whether a hit has occurred or not), the memory fetch state machine 110 sets the multiplexer 124 such that the lower 10 bits of the previous address drive the address lines of memory tag unit 116. If non-sequential monitor 118 determines that the current address on address bus 150 is non-sequential with respect to the previous address value stored within previous address latch 132, non-sequential monitor 118 will provide an appropriate read signal to memory tag unit 116 such that this current non-sequential address is stored within memory tag unit 116, along with the upper 18 bits of the previous address (as stored within previous address latch 132). This allows comparator 120 to subsequently compare the stored "previous" addresses with the address values of current fetch cycles executed on bus 150 to thereby determine whether a tag hit has occurred.

It is further noted that memory fetch state machine 110 is capable of determining whether a currently requested instruction by CPU core 52 is contained by prefetch code buffer 112. As stated previously, if the code is not contained by prefetch code buffer 112, the memory fetch state machine fetches the code from system memory 62.

In addition to storing the upper 18 bits of a previous line address along with the 28 bits of a next-requested, non-sequential line address (i.e., the "current" non-sequential line address) within a particular memory location of memory tag unit 116, a valid bit is also associated with each memory location of memory tag unit 116 (In one embodiment, the least-significant bit of each storage location is designated as the valid bit). Upon sytem reset, the valid bits are all cleared. Subsequently, when a non-sequential line address is stored within a designated memory location of memory tag unit 116 as described previously, the valid bit for that location is set by non-sequential monitor 118. Comparator 120 is configured such that a tag "hit" can be indicated for a particular current address only if the valid bit for a corresponding memory location within memory tag unit 116 is set.

As stated previously, a non-sequential line of code is prefetched by memory fetch state machine 110 when a tag hit to a valid entry within memory tag unit 116 occurs. Essentially, this means that on a previous iteration of the currently executing code, the next code requested by CPU core 52 was, for that past iteration, the prefetched non-sequential code. If during the current iteration, the non-sequential prefetch was mispredicted and the CPU core 52 instead requested a sequential line of code (i.e., the branch was not taken), the memory fetch state machine 110 must obtain the sequential code from system memory 62 and provide it to the CPU core 52. In response to such a misprediction, non-sequential monitor 118 invalidates the corresponding non-sequential entry within memory tag unit 116 by clearing the valid bit for that entry. Thus, upon a subsequent iteration of the code, the sequential rather than the non-sequential code will be prefetched. It is noted that in this manner, the heuristic prefetch unit 56 continuously "re-learns" each time a branch is either taken or is not taken, and bases its next prefetch for the particular code upon a preceeding iteration of that code.

Figure 4:
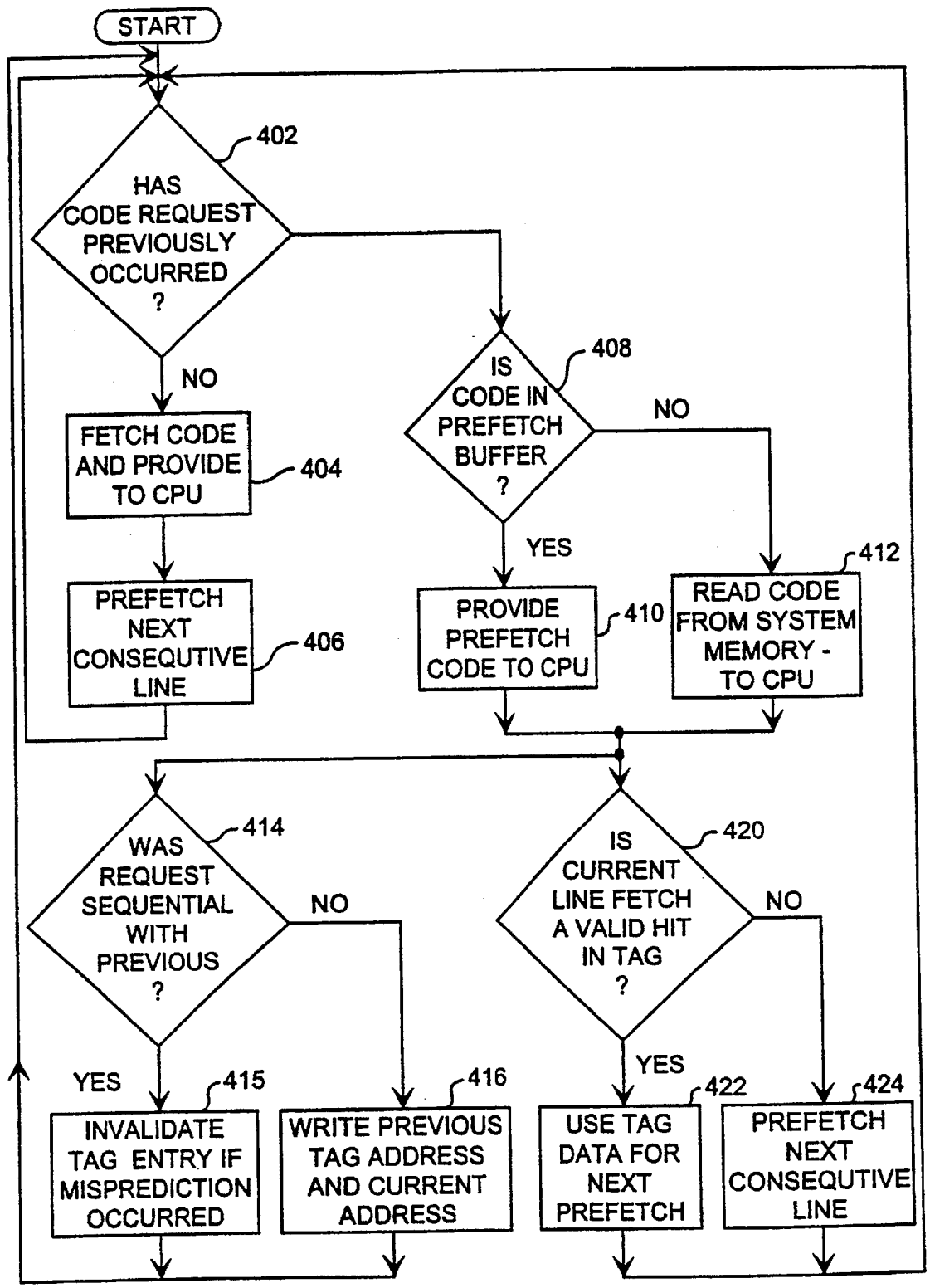
FIG. 4 is a flow diagram that illustrates the operation of the heuristic code prefetcher of FIG. 3.

Referring next to FIG. 4, a flow diagram is shown that illustrates the operation of the heuristic code prefetcher of FIG. 3. As indicated in FIG. 4, the heuristic code prefetcher first determines whether code has previously been read by CPU core 52 during a state 402. If no code has been previously read, the requested code is fetched from system memory 62 and is provided to CPU core 52 during step 404. Subsequently, during step 406, a sequential line of code is prefetched from system memory 62 and is loaded into prefetch code buffer 112.

When the next instruction fetch cycle is executed by CPU core 52, a previous code fetch will be indicated during step 402, and memory fetch state machine 110 will determine whether the requested data is contained by prefetch code buffer 112 during step 408. If the code is contained by prefetch code buffer 112, it is provided directly to CPU core 52 during step 410. On the other hand, if the code is not contained by prefetch code buffer 112, the code is read from system memory 62 and is provided to CPU core 52 during step 412. The line containing this requested code is simultaneously stored within a location of the prefetch code buffer 112.

During step 414, non-sequential monitor 118 determines whether the current code request is sequential with respect to the line of the previous code fetch. If the code fetch is consecutive with the previous code fetch, non-sequential monitor 118 does not cause the storage of any line address information within memory tag unit 116. Instead, during step 415, non-sequential monitor 118 causes the valid bit of a corresponding entry of memory tag unit 116 (i.e., the memory location corresponding to the lower 10 bits of the previous address) to be cleared if a non-sequential prefetch was performed for that entry (and thus was mispredicted). This invalidates that entry within memory tag unit 116.

If, on the other hand, the current code request is not sequential with the previous code fetch, the non-sequential monitor 118 causes the upper 18 bits of the previous line address, along with the current line address, to be stored within memory tag unit 116. As stated previously, the location of memory tag unit 116 into which these values are stored is addressed by the lower 10 bits of the previous line address. This occurs during step 416. During step 418, a valid bit associated with that location of the memory tag unit 116 is further set, indicating that the entry is valid.

At approximately the same time when steps 414, 416, and 418 are performed (either immediately before, immediately after, or simultaneously), comparator 120 determines whether the line address of the currently requested code as driven on address bus 150 is associated with a corresponding valid entry within memory tag unit 116 during step 420. If memory tag unit 116 has a valid entry corresponding to the line address on address bus 150, comparator 120 indicates a hit and causes memory fetch state machine 110 to drive the line address of the non-sequential code through multiplexer 126 and into prefetch address latch 130 during step 422. This non-sequential code is then prefetched. On the other hand, if the comparator 120 indicates that no hit has occurred with respect to a valid entry within memory tag unit 116, the address of the next sequential line is stored within prefetch address latch 130, and the corresponding sequential code is loaded into prefetch code buffer 112 during step 424.

It is noted that while the embodiment described above with respect to FIG. 3 prefetches non-sequential code based upon an immediately preceeding iteration of that code (and more specifically, based upon a single past iteration of that code), heuristic prefetch unit 56 could be alternatively configured to prefetch code based upon a history of several iterations of a particular code address. Therefore, for such an embodiment, if a non-sequential line fetch had been requested by CPU core 52 three times out of four following a particular previous line address, the prefetch address latch 130 would be loaded with the non-sequential target address stored by memory tag unit 116 upon the next iteration of the previous line address. On the other hand, if the non-sequential fetch had been taken only one time out of four iterations following the particular previous line address, the prefetch address latch 130 would instead be loaded with the address value of the sequential line.

It is further noted that while the embodiment of FIGS. 2 and 3 are employed in conjunction with a cache memory, the prefetch mechanism and technique described herein may be employed in systems without a cache memory subsystem. It is further noted that while the prefetch code buffer 112 is capable of storing two lines of code in the embodiment of FIG. 3, the prefetch code buffer 112 could be configured to store any number of lines of code, such as three. Furthermore, while the memory fetch state machine 110 is configured in the embodiment described above to fetch lines of code (that each contain two or more words of data), the memory fetch state machine 110 could be alternatively configured to fetch individual words of data.

It is finally noted that while the lower 10 bits of the previous address and the lower 10 bits of the current address are used to address memory tag unit 116, the number of bits may vary depending upon the memory capacity of memory tag unit 116. In addition, it is noted that the non-sequential monitor 118 may be implemented using comparator circuitry that compares the address of the previous address latch 132 with the current address driven on address bus 150.

Numerous variations and modifications will become apparent to those skilled in the art once the above disclosure is fully appreciated. For example, it is noted that the heuristic prefetch mechanism and technique described above may be employed within both pipelining and non-pipelining microprocessor architectures. It is intended that the following claims be interpreted to embrace all such variations and modifications.

What is claimed is:

1. A prefetch unit for a computer system configured to prefetch instruction code from a system memory comprising:

a prefetch code buffer configured to store prefetched code;

a prefetch address latch for storing an address value of code to be fetched;

a memory fetch unit coupled to said prefetch code buffer and to said prefetch address latch, wherein said memory fetch unit is configured to fetch from said system memory code corresponding to said address value within said prefetch code address latch and configured to provide said code to said prefetch code buffer;

a non-sequential monitor configured to compare an address of current code with an address of previous code to thereby detect whether said address of current code is non-sequential with respect to said address of previous code;

a memory tag unit coupled to said non-sequential monitor and configured to store an address of code which said non-sequential monitor and configured to store an address of code which said non-sequential monitor has detected as being non-sequential; and a comparator unit coupled to said memory tag unit and configured to determine whether an address of new code corresponds to an entry within said memory tag unit, wherein an address of a non-sequential code corresponding to said address of new code is provided to said prefetch address latch;

wherein an address of first code which said non-sequential monitor has detected as being non-sequential is stored as a first entry within said memory tag unit, said address of first code being provided to said prefetch address latch if said comparator unit indicates that said address of said new code corresponds to said first entry within said memory tag unit.

2. The prefetch unit as recited in claim 1 wherein said memory tag unit stores an address of second current code in response to a write signal asserted by said non-sequential monitor.

3. The prefetch unit as recited in claim 2 wherein said non-sequential monitor asserts said write signal if said non-sequential monitor has detected said address of said second current code to be non-sequential with respect to an address of second previous code.

4. The prefetch unit as recited in claim 1 wherein at least a portion of said address of said new code is provided to an address input of said memory tag unit.

5. The prefetch unit as recited in claim 1 wherein said memory tag unit is a random access memory.

6. The prefetch unit as recited in claim 1 wherein said memory tag unit is further configured to store at least a portion of an address of particular previous code corresponding to an address of particular current code which said non-sequential monitor has detected as being non-sequential.

7. The prefetch unit as recited in claim 6 wherein said comparator unit compares said at least a portion of said address of particular previous code with the address of said new code.

8. The prefetch unit as recited in claim 1 further comprising a sequential line adder for providing a sequential line address value to said prefetch address latch.

9. The prefetch unit as recited in claim 8 wherein said sequential line address value is provided to said prefetch address latch if said non-sequential monitor detects that an address of current code is sequential with respect to an address of previous code.

10. The prefetch unit as recited in claim 1 further comprising a previous address latch coupled to said non-sequential monitor for storing said address of said previous code.

11. The prefetch unit as recited in claim 1 wherein said prefetch code buffer is configured to store a line of several words of prefetched code.

12. The prefetch unit as recited in claim 1 wherein said prefetch code buffer is configured to store a plurality of line of prefetched code.

13. The prefetch unit as recited in claim 10 further comprising a multiplexer for selectively providing to said prefetch address latch either an address of code which said non-sequential monitor has detected as being sequential or an address of code which said non-sequential monitor has detected as being non-sequential.

14. A method for prefetching instruction code from a system memory comprising the steps of:

comparing an address of a current code request by a CPU core with an address of a previous code request to thereby determine whether said address of a previous code request is non-sequential with respect to said address of said previous code request;

storing the address of said current code request if non-sequential with respect to the address of said previous code request;

determining whether an address of a subsequent code request corresponds to said previous code request; and prefetching said current code from said system memory;

wherein said step of prefetching said address of said current code from said system memory is performed if said address of said subsequent code request corresponds to said address of said previous code request.

15. The method for prefetching instruction code from a system memory as recited in claim 14 comprising the further step of prefetching an address of sequential code if said address of said subsequent code request does not correspond to said address of said previous code request.

16. The method for prefetching instruction code from a system memory as recited in claim 14 wherein said step of prefetching said address of said current code from said system memory includes prefetching an entire line comprising said address of said current code.

17. The method for prefetching instruction code from a system memory as recited in claim 14 further comprising the step of storing said current code within a prefetch code buffer.

18. The method for prefetching instruction code from a system memory as recited in claim 14 comprising the further step of storing said address of said previous code request.

* * * * *